United States Patent [19]
Smith

[11] Patent Number: 5,950,140
[45] Date of Patent: Sep. 7, 1999

[54] METHOD AND APPARATUS FOR SLOPE CREEP MONITORING

[75] Inventor: Derek Steve Smith, Sunnyvale, Calif.

[73] Assignee: Trimble Navigation Limited, Sunnyvale, Calif.

[21] Appl. No.: 08/675,946

[22] Filed: Jul. 5, 1996

[51] Int. Cl.⁶ .................................................. G06F 19/00
[52] U.S. Cl. ............................................................ 702/2
[58] Field of Search .................................. 364/420, 421, 364/422; 702/2, 5, 14, 15

[56] References Cited

U.S. PATENT DOCUMENTS

| | | | |
|---|---|---|---|
| 4,170,776 | 10/1979 | MacDoran | 342/458 |
| 5,124,915 | 6/1992 | Krenzel | 364/420 |
| 5,144,317 | 9/1992 | Duddek et al. | 342/357 |
| 5,150,310 | 9/1992 | Greenspun et al. | 342/451 |
| 5,471,218 | 11/1995 | Talbot et al. | 342/357 |

OTHER PUBLICATIONS

Yehuda Bock et al., "Detection of crustal deformation from the Landers earthquake sequence using continusou geodetic measurements", Nature, vol. 361, Jan. 28, 1993, pp. 337–340.

C. DeMets, et al., "Anticipating the Successor to Mexico's Largest Historical Earthquake", Earth in Space, vol. 8, No. 5, Jan. 1996, p. 6+ (copy is 4 pages).

S. Sakurai et al., "Monitoring Of Cut Slopes By Using The Global Positioning System (GPS)", Journal Of Mining Research, vol. 1, No. 3, Oct. 1992, pp. 19–29.

Shimada et al., "Detection of a Volcanic Fracture Opening in Japan Using Global Positioning System Requirements", Nature, vol. 343, iss. 6259, Feb. 15, 1990, pp. 631–633 (Abstract only).

Maranto, "Crusty Measures", Discover, vol. 11, Iss. 12, Dec. 1990, pp. 32–33 (Abstract only).

Miller et al., "Regional coseismic deformation from the Jun. 28, 1992, Landers, California, earthquake: Results from the Mojave GPS network", Geology, vol. 21, Iss. 10, Oct. 1993, pp. 868–872 (Abstract only).

Bock, "Crustal deformation and earthquakes", Geotimes, vol. 39, Iss. 6, Jun. 1994, pp. 16–18 (Abstract only).

*Primary Examiner*—Donald E. McElheny, Jr.
*Attorney, Agent, or Firm*—Blakely, Sokoloff, Taylor & Zafman LLP

[57] ABSTRACT

According to one embodiment, a slope of a land mass is precisely monitored. Remote sensors are placed in selected positions on the slope. The remote sensors are configured to provide real time position information. A virtual model of the slope is created using positioning information generated by the remote sensors and is stored in a computer memory. The position of each remote sensor is also recorded in the computer memory so that the virtual model accurately reflects the real world situation. A threshold value is set to establish a permissible deviation of each remote sensor location. Real time positioning information produced by the remote sensors is monitored at a base station and is used to update the virtual model. If the position of a remote sensor deviates beyond its associated threshold value, an alarm message is flashed. The information so obtained can also be displayed to a user as a graphical and textual representation of the current state of the slope. Reports can be generated once an alarm message is given.

11 Claims, 5 Drawing Sheets

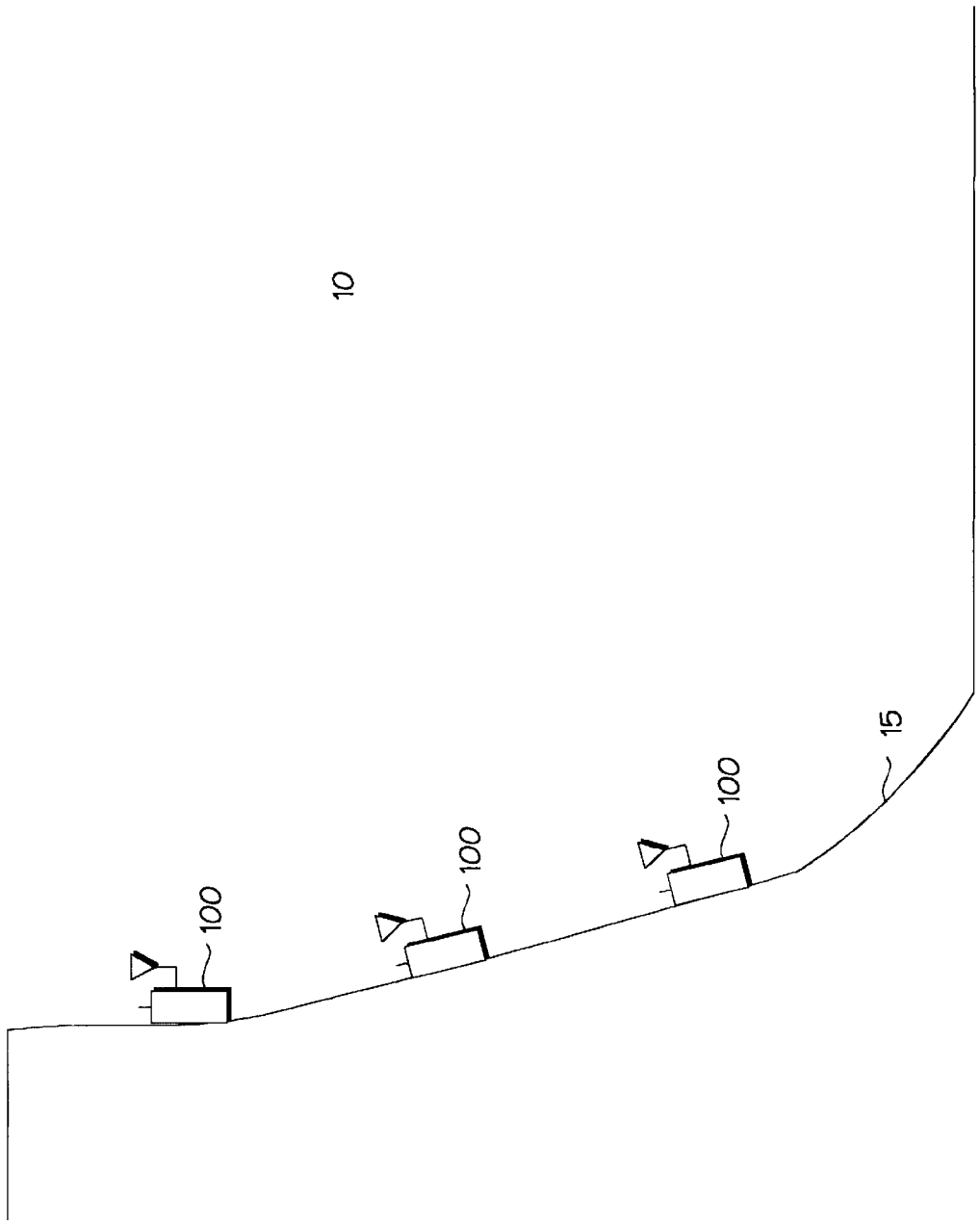

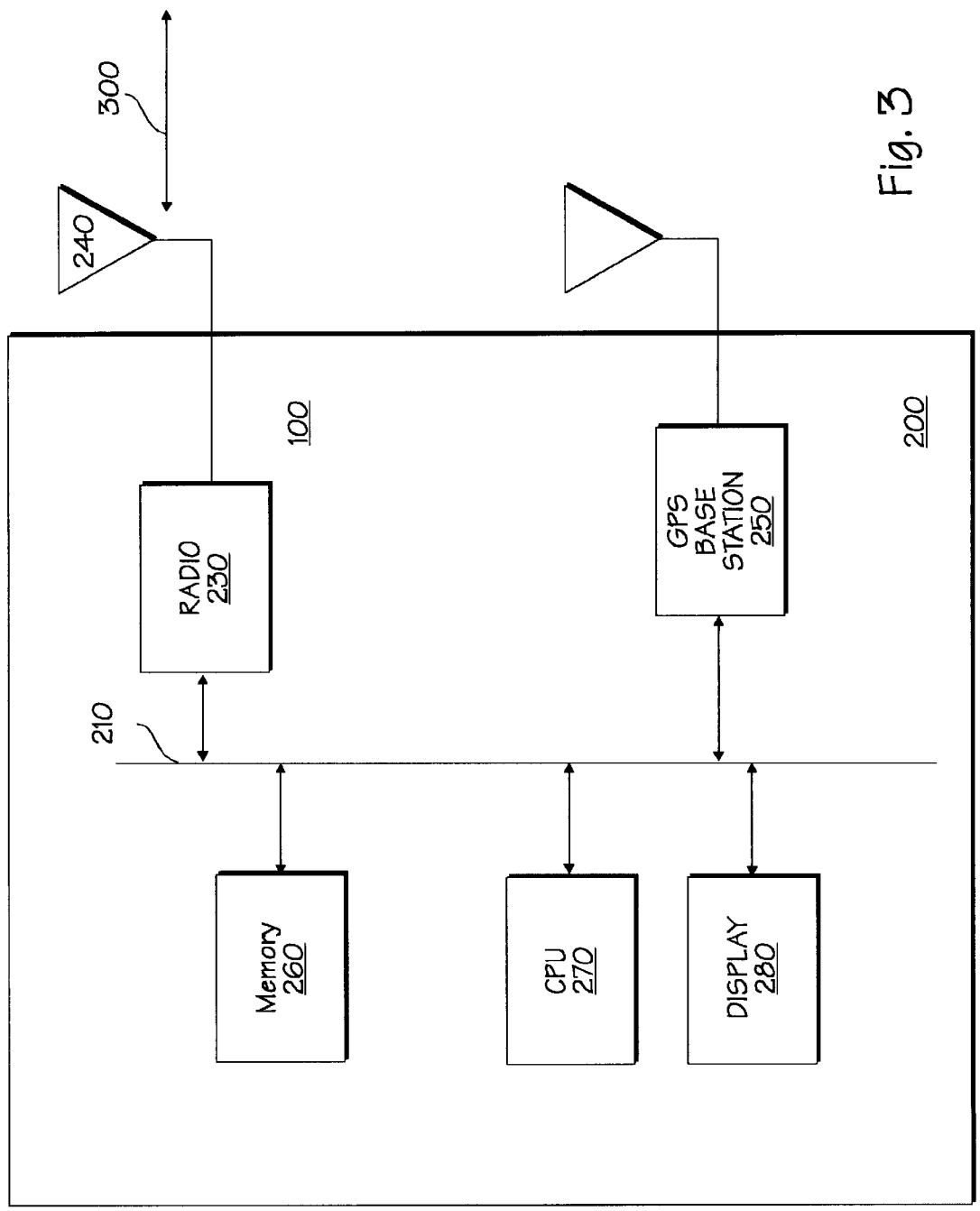

METHOD AND APPARATUS FOR SLOPE CREEP MONITORING

FIELD OF THE INVENTION

The present invention relates generally to real time positioning systems and, more particularly, to the use of such systems for the precise monitoring of land masses.

BACKGROUND

In the mining environment, minerals are sometimes excavated through the process of repetitive explosions. These explosions aid in exposing the ore, making it easier to collect and carry out on trucks for further processing at nearby facilities. However, the explosions also have a damaging effect upon the landscape of the mine. Continuous explosion blasts may cause steep slopes around the edges of the mine that are unstable and highly susceptible to avalanche type landslides. These landslides may cause serious injury to workers in the mine, destroy valuable equipment, or leave the ore burried under tons of rubble and, hence, unrecoverable.

Continuous monitoring of the slopes is required while a mine is being operated. Traditional methods of monitoring include stretching a taut wire along the surface of the slope, or using laser-based systems combined with a series of strategically placed prisms. Such methods are inefficient because they either require an inordinate amount of adjustments, or require trained personnel to visit the mine each time an adjustment is necessary.

Modern monitoring methods are able to make use of remote satellite-based positioning systems. The satellite system most commonly used today is the Global Positioning System (GPS). Engineering and monitoring methods which use GPS can be considerably more efficient and accurate than traditional methods. GPS utilizes signals transmitted by a number of in-view satellites to determine the location of a GPS mobile antenna which is connected to a receiver. The exact position of the antenna can then be monitored from a base station to determine whether there has been any movement of the position of the receiver.

Each GPS satellite transmits two coded L-band carrier signals which enable some compensation for propagation delays through the ionosphere. Each GPS receiver contains an almanac of data describing the satellite orbits and uses ephemeris corrections transmitted by the satellites themselves. Satellite to antenna distances may be deduced from time code or carrier phase differences determined by comparing the received signals with locally generated receiver signals. These distances are then used to determine antenna position. Only those satellites which are sufficiently above the horizon can contribute to a position measurement, the accuracy of which depends on various factors including the geometrical arrangement of the satellites at the time when the distances are determined.

Distances measured from an antenna to four or more satellites enable the antenna position to be calculated with reference to the global ellipsoid WGS-84. Local northing, easting and elevation coordinates can then be determined by applying appropriate datum transformation and map projection. By using carrier phase differences in any one of several known base or mobile receiver techniques, the mobile antenna coordinates can be determined to an accuracy on the order of ±1 cm. Using such real time kinematic (RTK) techniques, an operator can obtain position measurements within seconds of placing a mobile antenna on an unknown point. In RTK systems, GPS data is transmitted by a radio or other link between the base and mobile receivers, whether or not there is a dear line of site to ensure that accuracy in the mobile position measurements is maintained and the positioning information is correct.

SUMMARY OF THE INVENTION

According to one embodiment, a slope of a land mass is precisely monitored. Remote sensors are placed in selected positions on the slope. The remote sensors are configured to provide real time position information. A virtual model of the slope is created using positioning information generated by the remote sensors and is stored in a computer memory. The position of each remote sensor is also recorded in the computer memory so that the virtual model accurately reflects the real world situation. A threshold value is set to establish a permissible deviation of each remote sensor location. Real time positioning information produced by the remote sensors is monitored at a base station and is used to update the virtual model. If the position of a remote sensor deviates beyond its associated threshold value, an alarm message is flashed. The information so obtained can also be displayed to a user as a graphical and textual representation of the current state of the slope. Reports can be generated once an alarm message is given.

BRIEF DESCRIPTION OF THE DRAWINGS

The present invention is illustrated by way of example and not limitation in the figures of the accompanying drawings in which:

FIG. 1 illustrates a cross section view of the slope of a land mass;

FIG. 3 illustrates a base station of a monitoring system according to one embodiment;

DETAILED DESCRIPTION

Figure 2A:
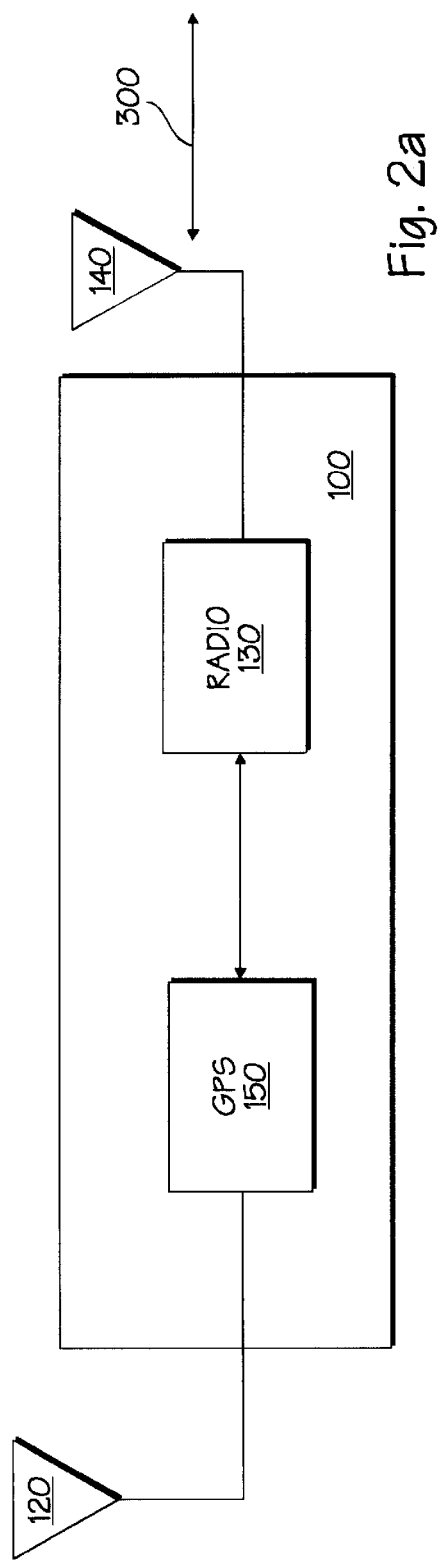
FIG. 2a illustrates a remote sensor of a monitoring system according to one embodiment.

Referring to the drawings in detail, wherein like numerals designate like parts and components, the following description sets forth numerous specific details in order to provide a thorough understanding of the present invention. However, after reviewing this specification, it will be apparent to those skilled in the art that the present invention may be practiced without some or all of these specific details. In other instances, well known structures, programming techniques and devices have not been described in detail in order not to unnecessarily obscure the present invention.

FIG. 1 illustrates a cross section view of a slope 15 of a mine or other land mass 10. According to the present invention, remote sensors 100 are strategically positioned along slope 15. Remote sensors 100 determine location coordinates and transmit the coordinates to a base station (not shown) via radio or other communication link. The base station may be located at a site that is in close proximity to the mine 10, or may be positioned at a distant site. Alternatively, remote sensors 100 may transmit raw GPS data received at the sensors 100 to the base station for further processing (e.g., position determination) at the base station.

FIG. 2a illustrates a remote sensor 100 of a slope monitoring system according the present invention. Remote sensor 100 includes a GPS sensor 150 which is coupled to a radio 130. GPS sensor 150 has an associated antenna 120 which is placed in a strategic location on slope 15.

GPS sensor 150 is capable of receiving signals from in-view satellites in order to produce positioning information therefrom. The positioning information is transferred to and modulated by radio 130 and transmitted from antenna 140 to a base station via radio link 300. Although a preferred embodiment uses a remote sensor 100 having a self-contained GPS sensor 150 and radio 130, those skilled in the art will appreciate that multiple GPS sensors 150 placed in different locations may be coupled to one radio 130. Furthermore, those skilled in the art will appreciate that this coupling may be achieved using a hardwired connection, an optical connection or, in some cases, a wireless connection.

Radio 130 receives and demodulates real-time kinematic GPS data transmitted to sensor 100 by a GPS base station. This real-time kinematic GPS data may be transmitted across radio link 300 or separate communication link using techniques well known in the art.

Figure 2B:
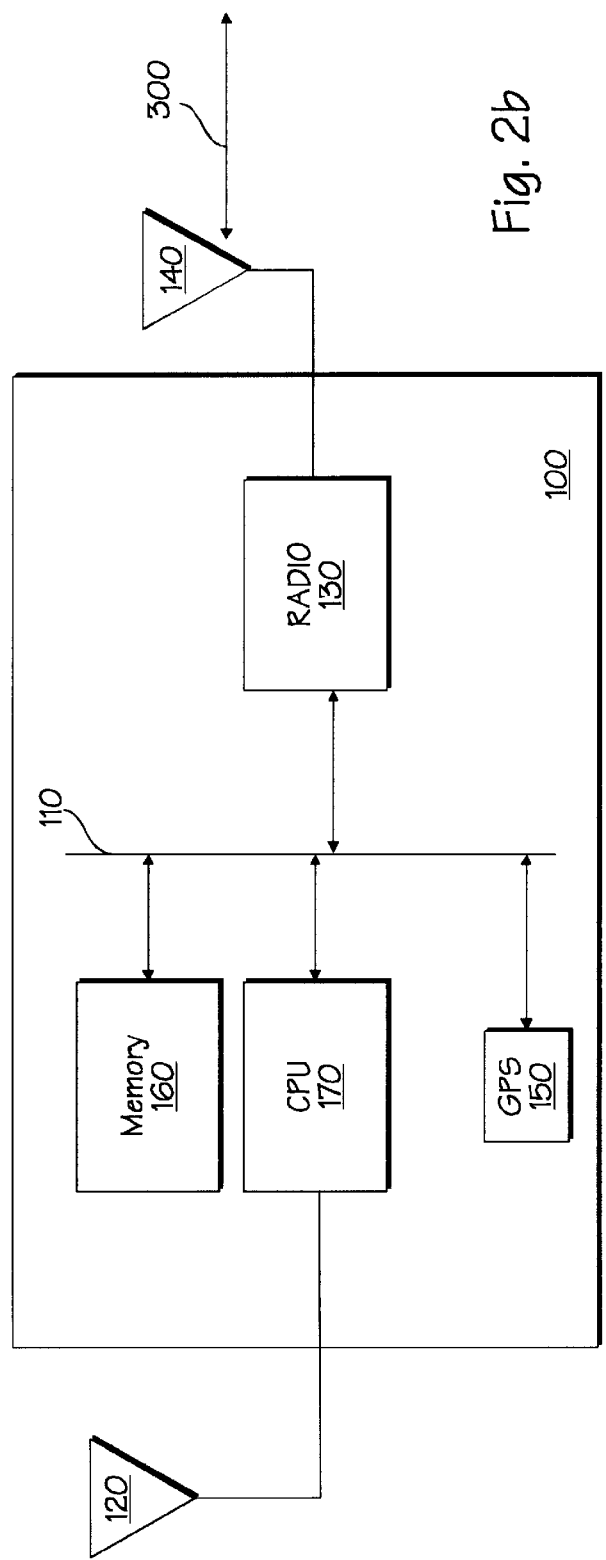
FIG. 2b illustrates a remote sensor of a monitoring system according to a second embodiment.

FIG. 2b illustrates an alternative embodiment of remote sensor 100. In this embodiment, remote sensor 100 consists of a GPS sensor 150, a memory 160, and a central processing unit (CPU) 170. Each of these components is linked to a radio 130 via a bus 110. Again, GPS sensor 150 has an associated antenna 120 which is placed in a strategic location on slope 15.

GPS sensor 150 receives positioning information through antenna 120, under the control of CPU 170. As before, radio 130 receives and demodulates real-time kinematic correction information received from a base station via radio link 300. The correction information is transmitted from the radio 130 to the CPU 170 over the bus 110. CPU 170, in turn, makes the appropriate corrections to the positioning information produced by GPS sensor 150. Alternatively, these corrections may be performed by GPS sensor 150 itself. The positioning information so obtained may be updated continuously to produce an updated position. Each updated position may be compared against a previously generated position to determine whether the sensor, i.e., the ground to which the sensor is fixed, has moved. If movement is detected, an alarm message may be generated by CPU 170 and transmitted via radio 130 and radio link 300 to a base station (not shown). It will be appreciated that the control information required to perform these calculations may be stored in memory 160 or other suitable storage medium and executed by CPU 170.

According to another embodiment, remote sensor 100 operates under a variable collection duty cycle. The variable collection duty cycle enables the remote sensor 100 to become active and collect position information at user-defined intervals. Consequently, the variable collection duty cycle enables remote sensor 100 to conserve battery life. The variable collection duty cycle may be implemented as a poll-and-respond system wherein remote sensors 100 are in a low power mode initially, listening for an activation signal from a base station. When a user wishes to obtain positioning information, an activation signal from the base station is transmitted to the remote sensors 100. Upon detecting the activation signal, each remote sensor 100 activates its internal GPS sensor 150 and begins to collect positioning data from in-view satellites. The activation signal may include real-time kinematic GPS data, thereby allowing GPS sensors 150 to derive centimeter level accurate positions for the respective sensor 100. Alternatively, each remote sensor 100 may be configured to provide positioning information updates to a base station at regular intervals (e.g., hourly, daily, etc.), without the need for a polling request from a base station. In such an embodiment, real-time kinematic GPS data may be continually broadcast by a base station for use by remote sensors 100 as appropriate. Other variable duty cycle embodiments will be apparent to those skilled in the art upon review of this specification.

Although described with reference to individual remote sensors 100 having one antenna 120 for each GPS sensor 150, those skilled in the art will appreciate that a single GPS sensor 150 could be used with a number of antennas 120 connected thereto. In such an embodiment, GPS sensor 150 would include an antenna switch for switching between each of the various antennas 120 located at different locations on the slope 15. In this way, monitoring information for each location associated with an antenna 120 could be obtained in a sequential fashion. For those applications where simultaneous, real-time monitoring information from each location associated with an antenna 120 is not required, such an embodiment is sufficient. However, where real-time, simultaneous monitoring information is required, individual GPS sensors 150, each with its own antenna 120, will be required.

FIG. 3 illustrates a base station 200 of a slope monitoring system according the present invention. Base station 200 includes a radio 230, GPS base station 250, memory 260, central processing unit 270, and a display 280. Radio 230 includes antenna 240. Each of these components is coupled by a bus 210.

In order to derive centimeter level accurate positioning information, remote sensors 100 communicate with GPS base station 250 via radio link 300. GPS base station 250 provides real-time kinematic GPS data to allow remote sensors 100 to produce real-time, centimeter level accurate positioning information. The manner in which such calculations are derived are well known in the art. Alternatively GPS base station 250 could produce differential GPS (DGPS) correction information and provide same to remote sensors 100 via radio link 300. Those skilled in the art will appreciate that if DGPS is used, the positioning information derived from remote sensors 100 will be on the order of ±1 meter.

Base station 200 receives positioning information from one or more remote sensors 100 via radio link 300. Alternatively, raw GPS data from the remote sensors may be received at the base station 200 for later processing, as discussed above. Radio signals from radio 130 are received at antenna 240 and demodulated by radio 230 under the control of central processing unit (CPU) 270. This data may be stored in memory 260 or another storage device (not shown) for archiving purposes.

Figure 4:
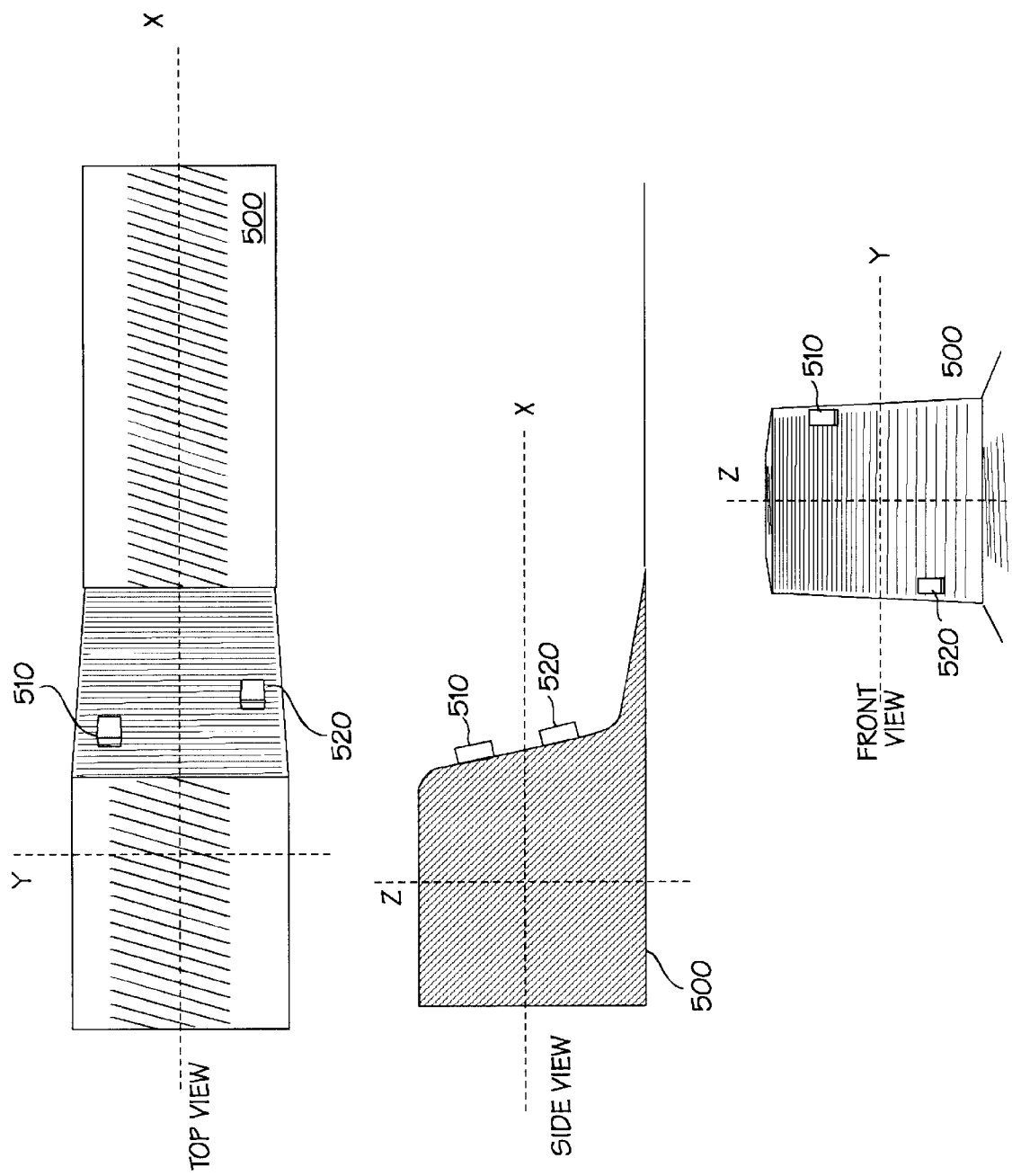
FIG. 4 illustrates various views of a land mass in three dimensions.

CPU 270 is also provided with a virtual model of slope 15. The virtual model is a three dimensional digital representation of slope 15 and is typically stored in memory 260. FIG. 4 illustrates a slope of a land mass represented in a virtual model. Land mass 500 might represent a mine 10 shown in FIG. 1, or some other land mass that requires monitoring. Using programming techniques well known in the art, land mass 500 is represented in a digital format and stored in a data structure (e.g. a GIS data structure) in memory 260. As remote sensors 100 are positioned on the land mass 500, their locations are received by base station 200 and recorded within the virtual model. For example, remote sensors 100 may be located at positions 510 and 520. These reference points are included in the virtual model with reference to an XYZ coordinate system.

The XYZ coordinate system is based on a WGS-84 coordinate system. This may be translated to a real world coordinate system using transformation techniques well known in the art.

Figure 5:
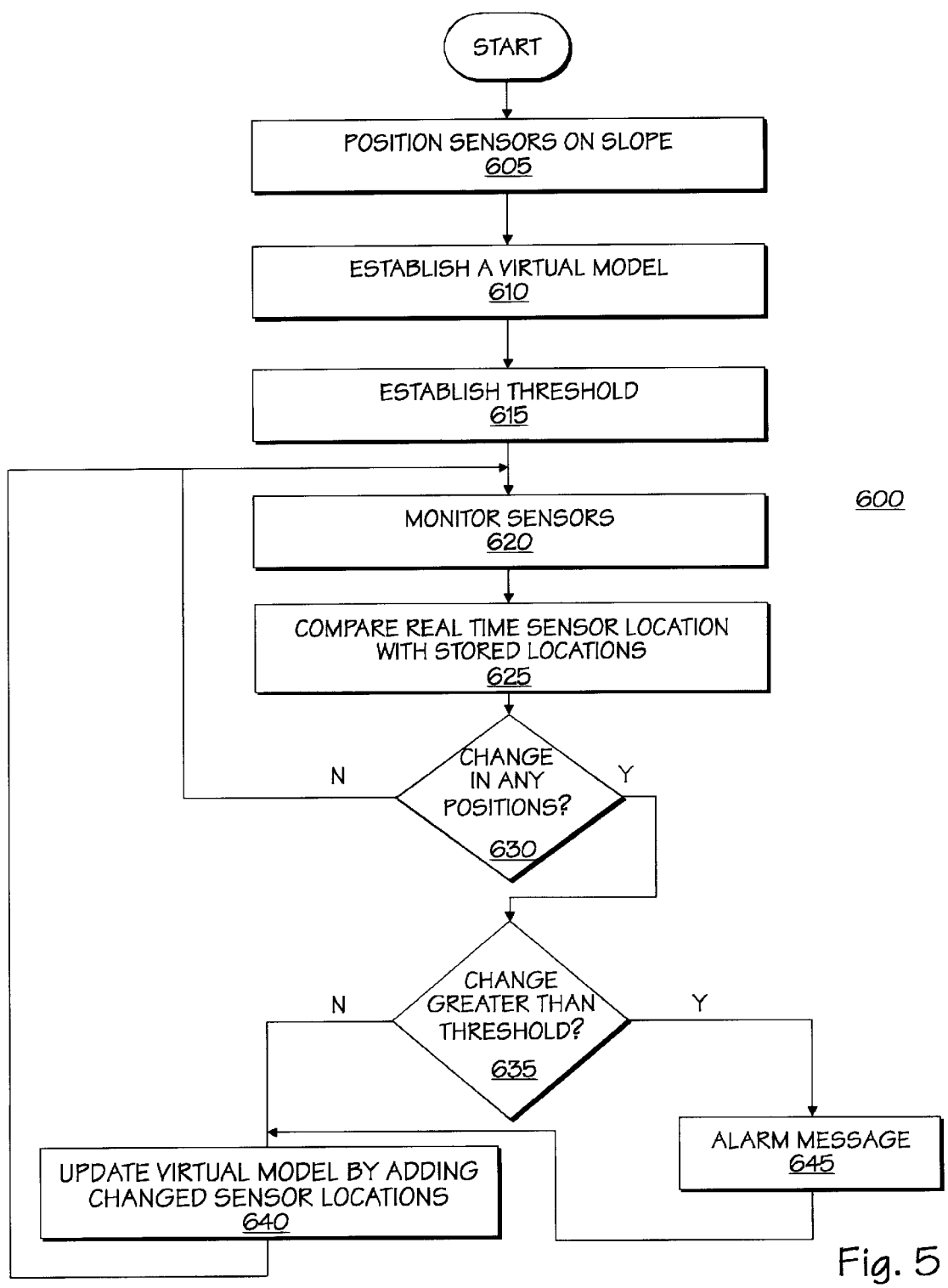
FIG. 5 is a flow diagram illustrating a method of monitoring slope creep according to one embodiment.

The virtual model so established can be used for accurate monitoring of slope 15 as follows and as illustrated in the flow diagram of FIG. 5. FIG. 5 shows a process 600 for the precise monitoring of slope 15 shown in FIG. 1. At step 605, remote sensors 100 are positioned on slope 15. At step 610, the virtual model of the slope is established using position information gathered by remote sensors 100. The virtual model is stored in memory 260 and represents a network of control points established by the positioning information provided by the remote sensors 100. At step 615, a threshold value is set for each remote sensor 100. The threshold value establishes a permissible range of movement for each remote sensor 100.

At step 620, slope 15 is in the process of being monitored. During the monitoring process, the data provided by the remote sensors 100 is monitored at the base station 200 using radio link 300. Real-time positioning information from each remote sensor 100 is multiplexed on a radio signal by radio 130 and transmitted via antenna 140 across radio link 300 to radio 230 located at base station 200. Radio 230 receives the radio link transmission 300 via antenna 240 and demultiplexes and demodulates the radio signal so as to present each of the individual remote sensor 100 data on bus 210.

At step 625, CPU 270 uses the real-time remote sensor data provided by radio 240 to compare the current position of each remote sensor 100 on slope 15 to the positions stored in memory 260 during step 610. At step 630, a determination is made as to whether any of the remote sensors 100 have changed in position. If there is no position change in any of the remote sensors 100, the process repeats above steps 620 and 625 until there is a change in position of a remote sensor 100.

If any remote sensors 100 change position, step 635 determines whether the change for any displaced sensor is greater or less than the threshold distance set in step 615. If the change for any or all displaced remote sensors 100 is less than the threshold distance, the process proceeds to step 640.

At step 640, CPU 270 uses the real-time sensor data provided by radio 230 to update the virtual model stored in memory. The virtual model is updated to represent the actual location of each remote sensor 100, as well as the original position of each remote sensor 100. In this regard, sensor data from remote sensors 100, aided by GPS data or correction information from GPS base station 250, provide precise positioning information using real-time kinematic or differential GPS techniques.

If the change of any displaced remote sensor 100 is greater than the established threshold distance, the process proceeds to step 645. At step 645, an alarm message is flashed on display 280 signaling significant movement of one or more remote sensors 100, thus indicating possible slope creep. Those skilled in the art will appreciate that any number of possible alarm signals such as warning messages, alarm bells and/or whistles, etc. could be used to indicate potential slope creep conditions.

The process continues to step 640, where the virtual model is updated to represent the actual location of each remote sensor 100, as well as the original position of each remote sensor 100. After step 640, the process repeats above steps 620–630 until there is another change in position of a remote sensor 100.

According to the embodiment described with reference to FIG. 2b, steps 620–630 could be carried out in remote sensor 100. If step 630 indicates that there has been a change in sensor position, the real-time position information is transmitted to base station 200 as described above. Steps 635–645 are then carried out in base station 200.

In an alternative embodiment, after the alarm message has been produced, CPU 270 collects a user defined set of data. This data may include a relatively long record of sensor information, e.g., on the order of 10 min., from remote sensors 100 on slope 15. The data is collected in the manner described above and stored in memory 280 or a similar storage device. The data is averaged to eliminate inaccurate readings (e.g., caused by noise in radio link 300) and mean values and standard deviations are computed. The result of this data collection is a virtual model that accurately reflects the status of slope 15. This information can be used to generate a report, which is a summary of the best estimate of the positions of remote sensors 100 on slope 15 for an engineering report. It will be appreciated that such reports may be continuously generated during the monitoring process as part of a background function and need not only be produced after an alarm condition has occurred.

Thus, a method and apparatus for precisely monitoring a slope of a land mass has been described. In the foregoing specification, the present invention has been described with reference to specific exemplary embodiments thereof. It will, however, be evident that various modifications and changes may be made thereto without departing from the spirit and scope of the invention as set forth in the appended claims. The specification and drawings are, accordingly, to be regarded in an illustrative rather than a restrictive sense.

What is claimed is:

1. A method of monitoring a land mass comprising the steps of:

positioning remote sensors in selected positions on a slope of the land mass, the remote sensors configured to provide real time positioning information;

establishing a virtual model of a land mass based on the positioning information from the remote sensors, the virtual model being stored in a memory;

associating digital representations of the positions of the remote sensors with the virtual model in a data structure in the memory;

monitoring the real time location information provided by the remote sensors; and modifying the remote sensor location within the virtual model so as to generate a real-time virtual model which corresponds to a current location of the remote sensors on the land mass.

2. The method of claim 1 wherein at least one of the remote sensors comprises a GPS sensor, and wherein the step of positioning comprises the steps of:

locating at least one GPS sensor on the slope such that an antenna associated with the GPS sensor is located at a strategic point on the slope so as to provide real-time positioning information concerning the strategic point.

3. The method of claim 1 wherein the remote sensors are coupled to a communication device and wherein the step of monitoring comprises the steps of:

providing the real-time location information produced by the remote sensors to the communication device;

modulating a communication signal with the real-time location information in the communication device and transmitting the communication signal over a communication link to a base station;

receiving the communication signal at the base station and demodulating the communication signal to extract the real-time location information; and processing the real-time location at the base station to produce update information for the virtual model.

4. The method of claim 3 wherein the step of modifying comprises the steps of:

updating the virtual model using the update information so that the virtual model corresponds to the actual location of the remote sensors.

5. The method of claim 1 further comprising the steps of:

setting a threshold value for a tolerable deviation in position for each remote sensor;

using the real time location information provided by each remote sensor to determine whether the threshold value has been exceeded; and displaying an alarm message upon a distance deviation of a real time remote sensor from the predefined coordinate system location greater than the threshold value.

6. A precise monitoring apparatus comprising:

a base station;

a remote sensor configured to provide real time positioning information and further configured to communicate with the base station; and a communication system coupling the remote sensor and the base station, the communication system providing a link for transmitting the real time positioning information between the remote sensor and the base station.

7. The precise monitoring apparatus of claim 6 wherein the remote sensor further comprises:

an internal bus;

a GPS receiver configured to communicate with the internal bus; the GPS receiver, further configured to generate the real time positioning information;

memory configured to communicate with the internal bus;

a microprocessor configured to communicate with the internal bus, the microprocessor configured to receive the real time positioning information from the GPS receiver and configured to provide the real time positioning information to the communication system for transmission to the base station.

8. The precise monitoring apparatus of claim 6 wherein the base station further comprises:

a system bus;

a memory configured to communicate with the system bus;

a display configured to communicate with the system bus;

a microprocessor configured to communicate with the system bus, the microprocessor configured to receive the real time positioning information from the communication system and configured to generate display information based on the real time positioning information, the microprocessor configured to transmit the display information to the display, wherein the display information is displayed on the display such that a user is provided with information regarding the position of the remote sensor.

9. A precise monitoring apparatus as in claim 6 wherein the communication system comprises a two-way radio communication system.

10. A precise monitoring apparatus as in claim 6 wherein the communication system comprises an optical communication system.

11. A method of generating a report regarding deviations of a slope, the method comprising the steps of:

positioning remote receivers in selected positions on the slope, the remote receivers configured to provide real-time position information regarding the slope;

monitoring the real-time location information provided by the remote receivers and using the information to create a virtual representation of the slope, the virtual representation being stored in a memory of a computer system;

terminating the monitoring of the information and generating a report regarding the position of the slope using the virtual representation.

* * * * *